United States Patent Office 3,814,770
Patented June 4, 1974

3,814,770
BIS-BASIC ESTERS OF FLUORENE AND FLUORENONE

Edwin R. Andrews and Stephen W. Horgan, Cincinnati, Ohio, assignors to Richardson-Merrell Inc., New York, N.Y.
No Drawing. Filed July 13, 1971, Ser. No. 162,270
Int. Cl. C07d 31/42
U.S. Cl. 260—293.56     8 Claims

ABSTRACT OF THE DISCLOSURE

Novel fluorene and fluorenone bis-basic ester compounds, their method of preparation and use as antiviral agents. The compounds are represented by the formula

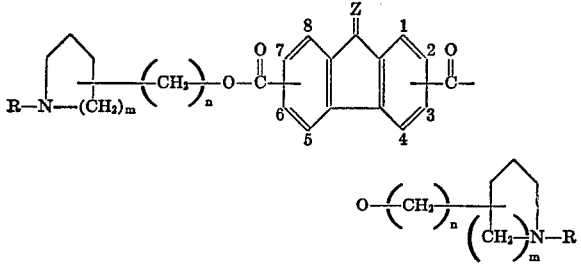

wherein Z is oxygen or $H_2$; $n$ is 0, 1 or 2; $m$ is 1 or 2 and R is hydrogen, lower alkyl of from 1 to 4 carbon atoms or alkenyl of from 3 to 6 carbon atoms having the vinyl unsaturation in other than the 1-position of the alkenyl group and with the proviso that when $n$ is 0 the oxygen atom is not connected to the carbons bearing the nitrogen atom or to the nitrogen atom of the heterocyclic ring. Also included are the acid addition salts of these compounds.

FIELD OF INVENTION

This invention relates to novel fluorene and fluorenone bis-basic esters having antiviral activity, compositions thereof which have antiviral activity and to the use of such compositions for inhibiting or inactivating viruses by subjecting a host or a host and a virus susceptible to replication inhibition to an antivirally effective quantity of such compositions.

SUMMARY OF INVENTION

It has now been found that compounds of the formula

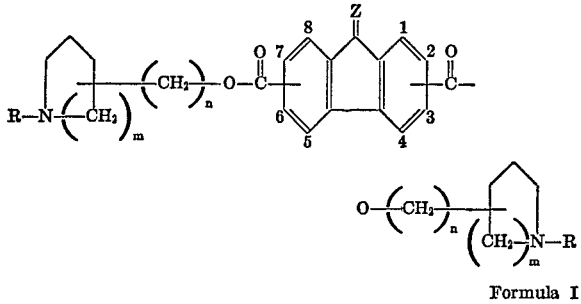

Formula I wherein Z is oxygen or $H_2$; $n$ is 0, 1 or 2; $m$ is 1 or 2 and R is hydrogen, lower alkyl of from 1 to 4 carbon atoms or alkenyl of from 3 to 6 carbon atoms having the vinyl unsaturation in other than the 1-position of the alkenyl group and with the proviso that when $n$ is 0 the oxygen atom is not connected to the carbons bearing the nitrogen atom or to the nitrogen atom of the heterocyclic ring, or pharmaceutically acceptable acid addition salts thereof are effective for inactivating or inhibiting a broad variety of viruses.

DETAILED DESCRIPTION OF INVENTION

The compounds of this invention have a tricyclic ring or nucleus which is a fluorene when Z in Formula I is $H_2$ or is a fluorenone when Z in Formula I is oxygen.

It can be seen from the above Formula I that one of the bis-basic ester groups, or side chains, that is,

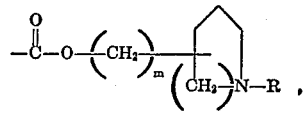

can be linked to the tricyclic ring by replacement of any of the four hydrogens of one of the benzenoid rings, and similarly, the second side chain is attached to the second benzenoid ring. Thus, one of the side chains can be attached in any of the positions 1 through 4 of the tricyclic ring and the other can be in any of the positions 5 through 8. Preferably, the side chains are in the 2- and 7-positions, respectively, of the tricyclic ring.

Illustrative of the radicals that R may represent in Formula I there may be mentioned, for example, hydrogen, lower alkyl such as methyl, ethyl, propyl or butyl and alkenyl groups such as allyl, 3-butenyl, 4-hexenyl and the like.

As examples of compounds of this invention there may be mentioned, for example, bis(1-methyl-3-piperidylmethyl)-9-oxofluorene-2,7-dicarboxylate,
bis(1-methyl-4-piperidyl)-9-oxofluorene-2,7-dicarboxylate,
bis(1-methyl-3-pyrrolidinyl)-9-oxofluorene-2,7-dicarboxylate,
bis(4-piperidyl)-9-oxofluorene-2,7-dicarboxylate,
bis(1-allyl-4-piperidyl)-9-oxofluorene-2,7-dicarboxylate,
bis(3-pyrrolidinylethyl)fluorene-2,7-dicarboxylate,
bis(1-methyl-3-piperidylmethyl)fluorene-2,7-dicarboxylate,
bis(1-allyl-4-piperidyl)fluorene-2,7-dicarboxylate,
bis(1-methyl-3-piperidylmethyl)fluorene-2,5-dicarboxylate,
bis(1-methyl-4-piperidyl)fluorene-1,7-dicarboxylate, and
pharmaceutically acceptable acid addition salts thereof.

Pharmaceutically acceptable acid addition salts of the base compounds of this invention are those of any suitable inorganic or organic acids. Suitable inorganic acids are, for example, hydrochloric, hydrobromic, sulfuric or phosphoric acids and the like. Suitable organic acids are, for example, carboxylic acids such as acetic, propionic, glycolic, lactic, pyruvic, malonic, succinic, fumaric, malic, tartaric, citric, ascorbic, maleic, hydroxymaleic, benzoic, hydroxybenzoic, phenylacetic, cinnamic, silicyclic, 2-phenoxybenzoic and the like, or sulfonic acids such as methane sulfonic, 2-hydroxyethane sulfonic acid and the like. Mono- or di-acid salts may be formed, and the salts can be hydrated or substantially anhydrous.

It has been found that the compounds of this invention are effective for inactivating or inhibiting a broad variety of viruses and can thus be employed as antiviral agents. These compounds are effective for preventing or inhibiting characteristic viral disease symptoms in a host by a wide variety of methods of application and composition. They can be administered for an antiviral effect by means which subject the host, or such host and a virus, to the active ingredients. The host is subjected to the active ingredients by bringing together an active ingredient and host, for example, by applying or contacting the host with such active ingredient or simply administering the active ingredient to the host. This includes subjecting the host to such active ingredient prior to infection with a virus, that is, prophylactic use, as well as subjecting the host to such active ingredient after infection, that is, therapeutic use. Thus, in viable biological material hosts subjected to the active ingredients, the replication of viruses is inhibited when the host is infected before or after being subjected to such ingredients. Also, administration by various routes of the active ingredients to an animal host prior to or after infection with the virus prevents or inhibits viral replication and the development of the various disease conditions characteristic of the particular virus. By the term "infection" we simply mean invasion of the host with a pathogenic virus. By the term "host" we mean viable biological material or intact animals which are capable of inducing the formation of interferon and which can support the replication of a virus. Preferably the host is of animal and particularly warm blooded or mammalian origin. Illustrative of hosts for various viruses there can be mentioned viable biological material such as can be used in the production of vaccines, for example, tissue cultures such as that of kidney, lung, amnion cells, embryos, for example, chick allantoic fluid; and various animals, for example, warm blooded animals such as birds or mammals, including mice, rats, guinea pigs, gerbils, ferrets and the like.

The mode of activity of the active ingredients is not rigorously defined. *Inter alia*, the active ingredients induce the formation of interferon when a host is subjected to such ingredients. Interferon is a known antiviral substance which is involved with the inhibition of the replication of viruses in the presence of a host cell. Some of the viruses susceptible to replication inhibition by interferon are set forth in Horsfall and Tamm, *"Viral and Rickettsial Infections of Man,"* 4th Edition (1965), J. B. Lippencott Company, pages 328–329.

The compounds of the present invention can be administered to animals such as warm blooded animals and particularly mammals to prevent or inhibit infections of picornavirus, for example, encephalomyocarditis; myxovirus, for example, Influenza $A_2$ (Jap/305); arbovirus, for example, Semliki forest; Herpes virus group, for example, herpes simplex; and poxviruses; for example, Vaccinia IHD. When administered prior to infection, that is, prophylactically, it is preferred that the administration be within 0 to 96 hours prior to infection of the animal with pathogenic virus. When administered therapeutically to inhibit an infection, it is preferred that the administration be within about a day or two after infection with pathogenic virus.

The dosage administered will be dependent upon the virus for which treatment or prophylaxis is desired, the type of animal involved, its age, health, weight, extent of infection, kind of concurrent treatment, if any, frequency of treatment and the nature of the effect desired. Illustratively, a daily dosage of the active ingredients will generally range from less than about 0.1 to over about 500 mg. (milligram) per kg. (kilogram) of body weight. Illustratively, dosage levels of the administered active ingredient can be intravenous, 0.1 to about 10 mg./kg.; intraperitoneal, 0.1 to about 50 mg./kg.; subcutaneous, 0.1 to about 250 mg./kg.; oral, 0.1 to about 500 mg./kg. and preferably about 1 to about 250 mg./kg.; intranasal instillation, 0.1 to about 10 mg./kg.; and aerosol, 0.1 to about 10 mg./kg. of animal body weight.

The novel compounds, together with conventional pharmaceutical carriers can be employed in unit dosage forms such as solids, for example, tablets or capsules or liquid solutions, suspensions or elixirs for oral administration and injections, or liquid solutions, suspensions, emulsions and the like for parenteral use. The quantity of active ingredient in each dosage will generally differ depending on the type of unit dosage, the type of animal and its weight. Thus, each dosage can contain from less than about 2.0 mg. to over 3 grams of active ingredients in a significant quantity of a non-toxic pharmaceutical carrier of the type that can be taken orally, applied topically, bucally or parenterally.

The pharmaceutical carrier can, as previously indicated, be a sterile liquid such as water and oils, with or without the addition of a surfactant. Illustrative of oils there can be mentioned those of petroleum, animal, vegetable or synthetic origin, for example, peanut oil, soybean oil, mineral oil, sesame oil, and the like. In general, water, saline, aqueous dextrose, and related sugar solutions and glycols such as propylene glycol or polyethylene glycol are preferred liquid carriers, particularly for injectable solutions. Sterile injectable solutions such as saline, for example, isotonic saline, will ordinarily contain from about 0.5% to 25% and preferably from about 1 to 10% by weight of the active ingredient in the composition.

As mentioned above oral administration can be in a suitable suspension or syrup, in which the active ingredient ordinarily will constitute from about 0.5 to 10%, and preferably from about 1% to 5%, by weight. The pharmaceutical carrier in such composition can be a watery vehicle such as an aromatic water, a syrup or a pharmaceutical mucilage; also, a suspending agent for viscosity control such as magnesium aluminum silicate, carboxymethylcellulose or the like as well as a buffer, preservative, etc.

The active ingredients can also be admixed in animal feed or incorporated into the animal's drinking water. For most purposes, an amount of active ingredient will be used to provide from about 0.0001% to 0.1% by weight of the active ingredient based on the total weight of feed intake. Preferably, from 0.001% to 0.02% by weight will be used. The selection of the particular feed is within the knowledge of the art and will depend, of course, on the animal, the economics, natural materials available, and the nature of the effect desired.

The active ingredients can be admixed in animal feed concentrates, suitable for preparation and sale to farmers or livestock growers for addition to the animal's feedstuffs in appropriate proportion. These concentrates can ordinarily comprise about 0.5% to about 95% by weight of the active ingredient compounded together with a finely divided solid, preferably flours, such as wheat, corn, soya bean and cottonseed. Depending on the recipient animal, the solid adjuvant can be ground cereal, charcoal, fuller's earth, oyster shell and the like. Finely divided attapulgite and bentonite can also be used.

The feed compositions, as well as the feed concentrates, can additionally contain other components of feed concentrates or animal feeds, as will be readily understood. Other particularly important additives include proteins, carbohydrates, fats, vitamins, minerals, antibiotics, etc.

For use as aerosols the active ingredients can be packaged in a pressurized aerosol container together with a gaseous or liquefied propellant, for example, dichlorodifluoromethane, carbon dioxide, nitrogen, propane, etc. with the usual adjuvants such as co-solvents, and wetting agents, as may be nesessary or desirable.

Typical surface active agents (Kirk and Othmer, *Encyclopedia of Chemical Terminology*, 1954, Vol. 13, page 513), particularly emulsifying and dispersing agents which can be used in the compositions of this invention are, for example, fatty alcohol sulfates such as sodium lauryl sulfate, aliphatic or aromatic sulfonates, such as sulfonated castor oil, and nonionic types of emulsifying or dispersing agents such as the high molecular weight alkyl polyglycol ethers, such as dodecyl polyglycol ethers containing from about 25 to 75 carbon atoms.

A desirable mode of administration for the compounds (active ingredients) of this invention is parenterally, such as by normally liquid injectable compositions, for example, for intramuscular or subcutaneous administration. In such compositions the quantity of active ingredient can vary from about 0.05% to 20% by weight of the composition and preferably from about 0.1% to 10% by weight. In order to minimize or eliminate irritation at the site of injection, the parenteral compositions can contain a non-ionic surfactant such as those having an HLB (hydrophile-lipophile balance) of about 12 to 17. Such formulations can be solutions, suspensions or emulsions in conventional liquid pharmaceutical carriers, for example, sterile liquids such as water, saline, and aqueous dextrose (glucose) and related sugar solutions. The quantity of surfactant in the formulation can vary from about 5% to 15% by weight of the formulation. The quantity of a compound of this invention, either in the base form or a pharmaceutically acceptable acid addition salt in such formulations, can vary over a broad range, such as that mentioned hereinbefore, that is, 0.05% to 20% by weight of the formulation. Preferably, the active ingredient is in the base form. The remaining component or components of such formulations can be a normally liquid pharmaceutical carrier, for example, isotonic aqueous saline, either alone or together with conventional excipients for injectable compositions. The surfactant can be a single surfactant having the above-indicated HLB or a mixture of two or more surfactants wherein such mixture has the indicated HLB. The following surfactants are illustrative of those which can be used in such formulations. (A) Polyoxyethylene derivatives of sorbitan fatty acid esters, such as the Tween series of surfactants, for example, Tween 80, and the like. The Tweens are manufactured by Atlas Powder Company. (B) High molecular weight adducts of ethylene oxide with a hydrophobic base formed by the condensation of propylene oxide with propylene glycol, for example, Pluronic F–68 which is manufactured by Wyandotte Chemical Company. The preferred surfactant is Polysorbate 80, U.S.P., a polyoxyethylene sorbitan monooleate.

The fluorene and fluorenone compounds of this invention can be prepared by reacting, in the presence or absence of a condensing agent, a fluorene or fluorenone dicarboxylic acid or reactive derivative thereof of the formula

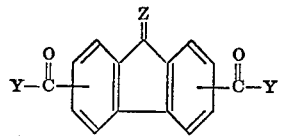

Formula II wherein Z is oxygen or $H_2$ and Y is an OH group, a halogen, or a lower alkoxy of from 1 to 4 carbon atoms, with an amino-alcohol of the formula

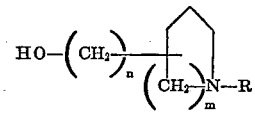

or an acid addition salt thereof wherein n, m, and R are as defined hereinbefore. In those instances where R is hydrogen the amine should be blocked to reactivity by the formation of a salt or, preferably, by substituting the amine with a readily removable blocking group such as, for example, carbobenzoxy, trifluoroacetyl, p-toluenesulfonyl and the like which can be removed after esterification with a suitable technique such as mild acid hydrolysis or catalytic reduction.

Condensation of the dicarboxylic acid with a salt of an aminoalcohol, 2 or more moles of the aminoalcohol per mole of the dicarboxylic acid, may be effected at 50° to 160° C. for a period of 6 to 72 hours in the presence of a catalyst such as p-toluenesulfonic acid, hydrochloric acid, sulfuric acid and the like and in the presence or absence of an inert solvent. Water may be removed azeotropically or by means of a water scavenger such as calcium oxide in a soxhlet apparatus attached so as to receive the vapors coming from the refluxing reaction mixture. Solvents such as xylene, toluene, dioxane, dimethylformamide and the like can be used.

Alternately, the esterification can be achieved by reacting the fluorene or fluorenone dicarbonyl halide with an aminoalkanol (2 or more moles of the aminoalkanol per mole of the dicarbonyl halide) in an inert solvent such as chloroform, benzene, tetrahydrofuran and the like which is dry and free of alcohols. The reaction may be run over a wide range of temperatures and reaction times but usually between 20° C. and the reflux temperature of the solvent for 1 to 24 hours. The reaction is preferably run for 2 hours at the reflux temperature of the solvent.

The fluorene compounds of this invention, except those containing olefinic unsaturation, can be prepared by the catalytic reduction of the corresponding fluorenone derivatives. In the case of those secondary amino derivatives which could rearrange to the corresponding amides as their free base, the reduction should be carried out maintaining the derivatives as their salts or otherwise blocked to rearrangement in the manner discussed hereinbefore. The hydrogenation reaction can be carried out in a variety of solvents, such as, for example, water, alcohols such as methanol, ethanol or the like, dimethylformamide, or a mixture of such solvents, preferably with heating. Catalysts such as platinum or palladium in a supported or unsupported state may be used.

EXAMPLES

The following examples are illustrative of the compounds of this invention and their preparation.

EXAMPLE 1

Bis(1-methyl-3-piperidylmethyl)-9-oxofluorene-2,7-dicarboxylate dihydrochloride dihydrate A suspension of 61.0 g. (0.20 mole) of 9-oxofluorene-2,7-dicarbonyl chloride in 2 liters of dry chloroform (ethanol-free) was stirred and treated with 51.2 g. (0.40 mole) of dry N-methyl-3-piperidylmethanol which caused a mildly exothermic reaction. The resulting mixture was stirred and refluxed for 16 hours, cooled to room temperature, and the desired product filtered. The compound was recrystallized twice from water-acetone to give a solid which, on standing in the atmosphere, formed a dihydrate. M.P. 257–268° C. (dec.);

$\lambda_{max.}^{water}$ 276; $E_{1\,cm.}^{1\%}$ 1640.

EXAMPLE 2

Bis(1-methyl-4-piperidyl)-9-oxofluorene-2,7-dicarboxylate dihydrochloride trihydrate Using the procedure of Example 1 with the exception that 45.7 g. (0.40 mole) of 4-hydroxy-N-methylpiperidine was used in place of N-methyl-3-piperidylmethanol, the named product was prepared. The product obtained on workup was recrystallized three times from water-methanol-acetone to give a compound which on standing in the atmosphere formed a trihydrate. M.P. 303–305° C. (dec.).

$\lambda_{max.}^{water}$ 276; $E_{1\,cm.}^{1\%}$ 1660.

EXAMPLE 3

Bis(1-methyl-3-piperidylmethyl)fluorene-2,7-dicarboxylate dihydrochloride hydrate A solution of 12.0 g. (0.02 mole) of bis(1-methyl-3-piperidylmethyl)-9-oxofluorene - 2,7 - dicarboxylate dihydrochloride dihydrate in 250 ml. of water was hydrogenated over 4.5 g. of 10% palladium on charcoal for four hours at room temperature and for 20 hours at 52° C. on a Paar hydrogenation apparatus. The reaction mixture was decanted from the catalyst and filtered through a filter aid. The filtrate was made alkaline with 20% NaOH solution and extracted twice with methylene chloride. The methylene chloride extracts were combined, washed with water and then with saturated NaCl solution and dried over $MgSO_4$. The solution, after filtering, was evaporated to a small volume and allowed to cool. It was acidified to Congo red with ethereal HCl and diluted with anhydrous ether. The solid which formed was filtered, washed and air dried. Following recrystallization from ethanol and air drying, the product containing 1.1% water was obtained. M.P. 255–257° C. (dec.);

$\lambda_{max.}^{0.1\ N\ HCl}$ 318; $E_{1\ cm.}^{1\%}$ 701.

EXAMPLE 4

Following the procedure of Example 1, only substituting for N-methyl-3-piperidylmethanol the appropriate molar equivalents of 4-piperidinol hydrochloride, N-ethyl-4-piperidinol, N-butyl-4-piperidylmethanol and 2-(N-methyl-3-piperidyl)ethanol, the following compounds are prepared respectively:

bis(4-piperidyl)-9-oxofluorene-2,7-dicarboxylate dihydrochloride,
bis(1-ethyl-4-piperidyl)-9-oxofluorene-2,7-dicarboxylate dihydrochloride,
bis(1-butyl-4-piperidylmethyl)-9-oxofluorene-2,7-dicarboxylate dihydrochloride, and
bis[2-(1-methyl-3-piperidyl)ethyl]-9-oxofluorene-2,7-dicarboxylate dihydrochloride.

These compounds are converted to their corresponding fluorene dicarboxylate compounds by reducing these oxofluorene compounds in the presence of a palladium catalyst.

EXAMPLE 5

Following the procedure of Example 1, only substituting for 9-oxofluorene-2,7-dicarbonyl chloride the appropriate molar equivalents of 9-oxofluorene-2,5-dicarbonyl and 9-oxofluorene-1,7-dicarbonyl chloride, the following compounds are prepared:

bis(1-methyl-3-piperidylmethyl)-9-oxofluorene-2,5-dicarboxylate dihydrochloride, and
bis(1-methyl-3-piperidylmethyl)-9-oxofluorene-1,7-dicarboxylate dihydrochloride.

These compounds are converted to their corresponding fluorene dicarboxylate compounds by reducing these oxofluorene compounds in the presence of a palladium catalyst.

EXAMPLE 6

Following the procedure of Example 1, only substituting for N-methyl-3-piperidylmethanol the appropriate molar equivalents of N-methyl-3-pyrrolidinol, 2-(3-pyrrolidinyl)ethanol hydrochloride, and N-allyl-4-piperidinol, the following compounds are prepared respectively:

bis(1-methyl-3-pyrrolidinyl)-9-oxofluorene-2,7-dicarboxylate dihydrochloride,
bis[2-(3-pyrrolidinyl)ethyl]-9-oxofluorene-2,7-dicarboxylate dihydrochloride, and
bis(1-allyl-4-piperidyl)-9-oxofluorene-2,7-dicarboxylate dihydrochloride.

EXAMPLE 7

An illustrative composition for hard gelatin capsules is as follows:

Per capsule, mg.
(a) Bis(1-methyl - 3 - piperidylmethyl) - 9 - oxo-
   fluorene-2,7-dicarboxylate dihydrochloride _____ 200
(b) Talc _____ 35

The formulation is prepared by passing the dry powders of (a) and (b) through a fine mesh screen and mixing them well. The powder is then filled into No. 0 hard gelatin capsules at a net fill of 235 mg. per capsule.

EXAMPLE 8

An illustrative composition for tablets is as follows:

Per tablet, mg.
(a) Bis(1-methyl - 3 - piperidylmethyl) - 9 - oxo-
   fluorene-2,7-dicarboxylate dihydrochloride _____ 100
(b) Wheat starch _____ 15
(c) Lactose _____ 33.5
(d) Magnesium stearate _____ 1.5

Preparation.—A granulation obtained upon mixing lactose with the starch and granulated starch paste is dried, screened and mixed with the active ingredient and magnesium stearate. The mixture is compressed in tablets weighing 150 mg. each.

EXAMPLE 9

An illustrative composition for pills is as follows:

Per pill, mg.
(a) Bis(1 - methyl - 3 - piperidylmethyl) - 9 - oxo-
   fluorene-2,7-dicarboxylate dihydrochloride _____ 100
(b) Starch, corn _____ 90
(c) Liquid glucose _____ 10

The pills are prepared by blending the active ingredient and starch and then adding the liquid glucose with thorough kneading to form a plastic mass. The pills are then cut and formed from the plastic pill mass.

EXAMPLE 10

A 2% weight per volume syrup of bis(1-methyl-3-piperidylmethyl)-9-oxofluorene-2,7-dicarboxylate dihydrochloride can be prepared by the usual pharmaceutical techniques according to the following formula:

Grams
(a) Finely divided bis(1-methyl-3-piperidylmethyl)-
   9-oxofluorene-2,7-dicarboxylate dihydrochloride _ 2.0
(b) Sucrose _____ 33.3
(c) Chloroform _____ 0.25
(d) Sodium benzoate _____ 0.4
(e) Methyl p-hydroxybenzoate _____ 0.02
(f) Vanillin _____ 0.04
(g) Glycerol _____ 1.5
(h) Purified water to 100.0 ml.

EXAMPLE 11

Bis(1 - methyl - 3 - piperidylmethyl) - 9 - oxofluorene-2,7-dicarboxylate dihydrochloride is mixed with soybean meal to prepare an animal feed concentrate containing 10 grams of said oxofluorene compound per pound of the medicated feed. This can subsequently be diluted with a mixed grain ration to give a medicated feed containing 50 milligrams of the oxofluorene per pound of the medicated feed.

EXAMPLE 12

The following formulation is illustrative of a dusting powder:

Per kilogram, grams
(a) Bis(1 - methyl-3-piperidylmethyl)-9-oxofluorene-
   2,7-dicarboxylate dihydrochloride _____ 20
(b) Silica aerogel _____ 980

The dusting powder is prepared by intimately admixing the ingredients. The mixture is then packaged in dispensing containers.

EXAMPLE 13

An illustrative composition for a parenteral injection is the following aqueous emulsion.

| Each ml. contains | Ingredients | Amount |
|---|---|---|
| 50 mg. | Bis(1-methyl-3-piperidylmethyl)-9-oxofluorene-2,7-dicarboxylate dihydrochloride, g. | 1.000 |
| 100 mg. | Polyoxyethylene sorbitan monooleate, g. | 2.000 |
| 0.0064 gm. | Sodium chloride, g. | 0.128 |
| | Water for injection, q.s. ml. | 20.000 |

The composition of Example 13 is prepared by dissolving 0.64 g. of sodium chloride in 100 ml. of water for injection; mixing the polyoxyethylene sorbitan monooleate with the oxofluorene, adding a sufficient solution of the sodium chloride in water to the active ingredient and polyoxyethylene sorbitan monooleate to make 20 ml.;

shaking the mixture; and then autoclaving it for 20 minutes at 110° C. at 15 p.s.i.g. steam pressure. The composition can be dispensed in a single ampule for multiple dosage or in 10 or 20 ampules for single dosages.

What is claimed is:

1. A compound selected from
(A) a compound of the formula

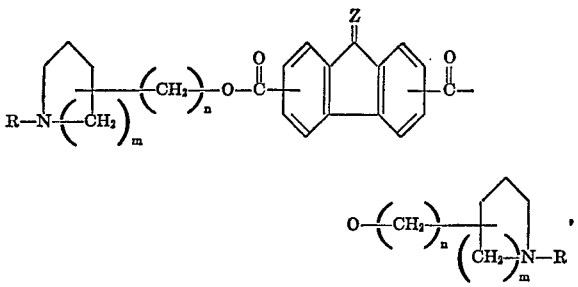

or
(B) a pharmaceutically aceptable acid addition salt thereof, wherein Z is oxygen or $H_2$; $n$ is 0, 1 or 2; $m$ is 1 or 2 and R is hydrogen, lower alkyl of from 1 to 4 carbon atoms or alkenyl of from 3 to 6 carbon atoms having the vinyl unsaturation in other than the 1-position of the alkenyl group and with the proviso that when $n$ is 0 the oxygen atom is not connected to the carbons bearing the nitrogen atom or to the nitrogen atom of the heterocyclic ring.

2. A compound of claim 1 wherein one of the

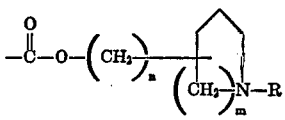

is in the 2-position of the ring system and the other such group is in the 7-position.

3. A compound of claim 1 wherein Z is oxygen.
4. A compound of claim 1 wherein Z is $H_2$.
5. A compound of claim 1 wherein $m$ is 1.
6. A compound of claim 1 wherein $m$ is 2.
7. A compound of claim 1 which is bis(1-methyl-3-piperidylmethyl)-9-oxofluorene-2,7 - dicarboxylate or a pharmaceutically acceptable acid adition salt thereof.
8. A compound of claim 1 which is bis(1-methyl-4-piperidyl)-9-oxofluorene-2,7-dicarboxylate or a pharmaceutically acceptable acid addition salt thereof.

References Cited
UNITED STATES PATENTS 3,531,489  9/1970  Albrecht et al. _____ 260—294.3
3,647,860  3/1972  Sill et al. _____ 260—475

HENRY R. JILES, Primary Examiner

M. A. M. CROWDER, Assistant Examiner

U.S. Cl. X.R.
260—326.3; 424—267, 274

PO-1050
(5/69)

UNITED STATES PATENT OFFICE
CERTIFICATE OF CORRECTION

Patent No. 3,814,770      Dated June 4, 1974

Inventor(s) Edwin R. Andrews and Stephen W. Horgan

It is certified that error appears in the above-identified patent and that said Letters Patent are hereby corrected as shown below:

Column 2, line 53, "silicyclic" should read "salicylic".
Column 7, line 31, "dicarbonyl and 9-oxofluorene" should read "dicarbonyl chloride and 9-oxofluorene". Column 9, claim 1, line 22, "aceptable" should read "acceptable".

Signed and sealed this 8th day of October 1974.

(SEAL)
Attest:

McCOY M. GIBSON JR.              C. MARSHALL DANN
Attesting Officer                Commissioner of Patents